US010234299B2

(12) United States Patent
Morales

(10) Patent No.: US 10,234,299 B2
(45) Date of Patent: Mar. 19, 2019

(54) GEO-LOCATION TRACKING SYSTEM AND METHOD

(71) Applicant: Osvaldo Morales, Normandy Park, WA (US)

(72) Inventor: Osvaldo Morales, Normandy Park, WA (US)

(*) Notice: Subject to any disclaimer, the term of this patent is extended or adjusted under 35 U.S.C. 154(b) by 0 days.

(21) Appl. No.: 15/845,066

(22) Filed: Dec. 18, 2017

(65) Prior Publication Data
US 2018/0172463 A1  Jun. 21, 2018

Related U.S. Application Data

(60) Provisional application No. 62/435,425, filed on Dec. 16, 2016.

(51) Int. Cl.
H04W 24/00 (2009.01)
G01C 21/34 (2006.01)
H04W 4/40 (2018.01)
A63F 13/216 (2014.01)
H04W 4/021 (2018.01)
H04L 29/06 (2006.01)
G06K 9/00 (2006.01)
H04W 4/029 (2018.01)
H04L 29/08 (2006.01)
H04W 4/024 (2018.01)

(52) U.S. Cl.
CPC ........ G01C 21/3476 (2013.01); A63F 13/216 (2014.09); G06K 9/00671 (2013.01); H04L 67/38 (2013.01); H04W 4/021 (2013.01); H04W 4/40 (2018.02); A63F 2300/205 (2013.01); H04L 67/20 (2013.01); H04W 4/024 (2018.02); H04W 4/029 (2018.02)

(58) Field of Classification Search
CPC ............... G01C 21/3476; A63F 13/216; A63F 2300/205; H04W 4/40; H04W 4/021; G06K 9/00671; H04L 67/38
USPC ..................................................... 455/456.3
See application file for complete search history.

(56) References Cited

U.S. PATENT DOCUMENTS 7,353,034 B2 * 4/2008 Haney ..................... H04W 4/21
455/457
7,912,628 B2 * 3/2011 Chapman ........... G01C 21/3691
701/117
7,953,549 B2 * 5/2011 Graham ................. G06Q 30/02
701/466

(Continued)

Primary Examiner — Marceau Milord
(74) Attorney, Agent, or Firm — Seed IP Law Group LLP

(57) ABSTRACT

A system and method that includes a user management device, a server, and executable instructions that provide geo-tracking routing from point to point in a geographical location and to geo-tracking of a user's progress by tracking user location via storing of waypoints along a route and developing a "return home" path for the user. The systems and methods described herein can be employed in a mapping system that may include various geo-tracking services, social networking services, and geo-tracking capabilities, and the determination of return paths, and utilizes Artificial Intelligence to map location, time, and user preferences. The method employs analysis of user trends and will recommend locations that the user will identify as useful. The user's interactive input will be age-agnostic.

13 Claims, 11 Drawing Sheets

(56) References Cited

U.S. PATENT DOCUMENTS

| | | | |
|---|---|---|---|
| 8,190,362 B2 * | 5/2012 | Barker | G08G 1/0104 |
| | | | 701/414 |
| 8,260,549 B2 | 9/2012 | Poppen | |
| 8,385,964 B2 * | 2/2013 | Haney | H04W 4/21 |
| | | | 455/519 |
| 8,621,374 B2 * | 12/2013 | Sheha | H04L 51/04 |
| | | | 701/532 |
| 8,930,134 B2 * | 1/2015 | Gu | G06Q 30/0205 |
| | | | 701/434 |
| 9,070,101 B2 * | 6/2015 | Abhyanker | G01C 1/00 |
| 9,116,000 B2 * | 8/2015 | Pakzad | G01C 21/206 |
| 9,204,251 B1 * | 12/2015 | Mendelson | G08G 1/14 |
| 9,319,471 B2 * | 4/2016 | Diem | G06Q 10/00 |
| 9,538,332 B1 * | 1/2017 | Mendelson | H04W 4/90 |
| 9,599,717 B2 * | 3/2017 | Havlark | G01S 5/0054 |
| 9,788,156 B1 * | 10/2017 | Anderson | H04W 4/021 |
| 9,940,663 B2 * | 4/2018 | Ward | G06Q 30/0639 |
| 2004/0203860 A1 * | 10/2004 | Fellenstein | H04M 3/493 |
| | | | 455/456.1 |
| 2013/0225205 A1 * | 8/2013 | Haney | H04W 4/21 |
| | | | 455/456.3 |
| 2014/0114561 A1 * | 4/2014 | Pakzad | G01C 21/206 |
| | | | 701/410 |
| 2014/0180914 A1 * | 6/2014 | Abhyanker | G01C 1/00 |
| | | | 705/39 |
| 2015/0051994 A1 * | 2/2015 | Ward | G06Q 30/0639 |
| | | | 705/23 |

* cited by examiner

GEO-LOCATION TRACKING SYSTEM AND METHOD

BACKGROUND

Technical Field

The present disclosure relates to systems and methods for administering geo-tracking solutions and routing users from point to point in a geographical location and, more particularly, to geo-tracking user progress by means of tracking user location by tracking and storing waypoints of the user to develop a "return home" path for the user and additional services described herein.

Description of the Related Art

Modern communication devices have substantial compute capacity. This compute capacity allows GPS tracking and other mapping capabilities to be installed on the device. The device may house a collection of operating elements for managing the operations of the system and applications. For example, the device may have different applications running on a single or multiple operating systems (OS). The devices are OS agnostic and the use of applications and APIs that call on other applications is a common use case for functions. Conventional use of mapping services determines an "A to B" route to ensure that a user arrives at their intended destination. The mapping services provide open loop directional data and none provide a service ensuring a route has been "pre-seeded" so as to build a digital path of routes taken, preferred routes, and routes that return the user to the initial destination. Also, there is no integration with social media that allows users to use other's experiences and history to ascertain routings and points of interest.

Conventional methods of mapping of systems can include routine, commonly used paths and the safest, most accurate return route as chosen by the user, generally working from predetermined lists of waypoints and predetermined routing or outcomes. Conventional methods for directing the performance of the tracking and/or tasks by users, however, can result in inefficient accomplishment of the return routes and return route tasks that will result in not being able to return to the initial starting point or any point.

BRIEF SUMMARY

In accordance with one aspect of the present disclosure, the system utilizes machine learning to direct a user toward trends and preferences of the user, and an option is provided for targeted directions and offerings leading users toward habits and findings from past tours and other user recommendations.

In accordance with the foregoing aspect of the present disclosure, a system to track a user's geographical position and plot one or more return routes via way points is provided. The system includes a user device operable to send and receive requests, messages, or information over a communication network, the device including a user interface capable of conveying information to the user of the device. The system further includes at least one application server and a data store that includes hardware and software for integrating with the data store as needed to execute aspects of one or more applications for the user device, handling a majority of data access and business logic for an application, the application server operable to provide access control services in cooperation with the data store to generate content comprising at least one from among text, graphics, audio, and video to be conveyed to the user via the user interface. In addition, the system includes executable instructions to be stored on the user device and operable to generate digital identifiable waypoints to ensure path tracking and to establish location and to generate a return path to be conveyed to the user via the user interface.

In accordance with another aspect of the present disclosure, the system can target a user with options for methodology and fastest route home (defined as a chosen starting point or final end point), and pulling in data from partner applications to present only pertinent and relevant data for the user.

In accordance with a further aspect of the present disclosure, the system creates a query methodology database that recognizes, through a machine learning platform, a third-party application query structure in order to streamline and limit the user's direct interaction with the third-party applications.

In accordance with yet another aspect of the present disclosure, the system interacts via Bluetooth™ or other technology with "smart" devices including, but not limited to, watches, home devices, virtual reality and augmented reality glasses, providing feedback to user as they achieve, deviate, are awarded, and are recommended new activities.

In accordance with still yet a further aspect of the present disclosure, the system feedback is defined by the user device and device capabilities. Where a device is capable of providing active feedback (vibration, sound indications, etc.), the system will generate a feedback mechanism, such as screen pulses, in a manner to alert the user of a change in status on their journey.

In accordance with another aspect of the present disclosure, the system will allow open source and programmable "Easter Eggs," permitting application ("app") creators to create operations specific to the system, such as, for example, a coupon or special award being provided to users for repeat use or visitation to a location and feedback on the specific location (e.g., pictures, using a waypoint).

In accordance with a further aspect of the present disclosure, the system provides machine learning algorithms for application optimization at other companies. In accordance with yet another aspect of the present disclosure, the algorithms may be a charge service in which a pay-to-play option offers priority ranking within the system's application resource center.

In accordance with yet another aspect of the present disclosure, users will be able to claim awards left by other users, such as a "message in a bottle" left by a previous user. The users will be able to collect the awards being left by previous users, sharing data on their experiences, etc.

In accordance with a further aspect of the present disclosure, a user will be notified when their path or "crumb trail" brings them within "X" meters of a predetermined type of establishment, potentially determined by time of day, i.e., 8:00 am to 10:00 am "notify if I am near a breakfast restaurant with more the 3½ stars on Yelp or Urbanspoon or any third-party API."

In accordance with still yet another aspect of the present disclosure, the system can be used to lay down tracks for others within a group, allowing the user to find or locate their group.

In accordance with an additional aspect of the present disclosure, the system utilizes "tracks" in an active or non-active state, which allows the system to track while on or off the network and outside of a GPS range.

In accordance with a process of the present disclosure, a method of providing instructions to a user for route guidance is provided. The method includes:

(a) receiving route guidance instructions to one or more waypoints in a mapping system;

(b) in response to the instructions, determining a first specific waypoint of the one or more waypoints;

(c) generating an indication for display to the user one or more instructions to enable navigating by the user on a first route to a location associated with a first waypoint;

(d) generating an indication for display to the user instructing the user to go to the first waypoint;

(e) querying a mapping system to determine whether the user is located at the first waypoint;

(f) in response to determining the user has reached the first waypoint, generating an indication for display to the user that the first waypoint has been reached;

(g) determining a second route for completion after the first waypoint has been successfully reached and the user is still on route, based on the received directions;

(h) generating an indication for display to the user instructions for navigating to a second waypoint;

(i) querying the mapping system to determine whether the second waypoint has been reached;

(j) repeating (h) and (j) for additional waypoints.

In accordance with another aspect, the method includes generating an indication for display to the user instructing the user to perform a task at the second specific waypoint. The waypoint can include at least one from among a public place, a landmark, and an address. In some instances the waypoint can include instructions for completing a task at the waypoint.

In accordance with a further aspect of the method, querying the mapping system includes checking for route integrity and completion before moving on to additional waypoints on the route. Verifying that a route is complete can include receiving a user input indicating one or more of that a waypoint has been reached and that a route is complete.

In accordance with still yet another aspect of the method, verifying includes the user providing an indication in the form of a code or photographic image.

In accordance with yet a further aspect of the method, the determining a second route may include skipping one or more routes and waypoints received in the instructions in response to user input.

In accordance with another aspect of the method, querying the mapping system to determine if the second waypoint has been reached includes checking for user return progress completion to the second waypoint.

In accordance with another implementation of a process of the present disclosure, a method for real time route guidance to a user is provided. The method includes, without limitation, the following steps:

(a) receiving instructions for performing return routing waypoints in a mapping system;

(b) in response to the instructions, determining an ordered list of waypoints, including at least a first specific return point based on one or more of how visible the waypoint is and proximity to a well-known waypoint;

(c) allocating routes from the list of waypoints to one or more multiple users depending on allocation of a return route from the list of waypoints;

(d) generating instructions to a user assigned to the first route for navigating to a location associated with a nearest waypoint from the list of waypoints;

(e) tracking user movement from a point of initiation to waypoints on the list of waypoints;

(f) generating a prompt to the user to determine whether the first waypoint has been reached;

(g) verifying by comparative analysis of the route traveled by the user whether the user has completed a route to the first waypoint and in response to determining the route is incomplete or the waypoint has not been reached, generating an indication for display to the user that the route is incomplete or that the waypoint has not been reached, and in response to verifying the route is complete or the waypoint has been reached, generating an indication for display to the user that the route is complete or that the way point has been reached;

(h) repeating (d)-(g) for all waypoints on the list of waypoints.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
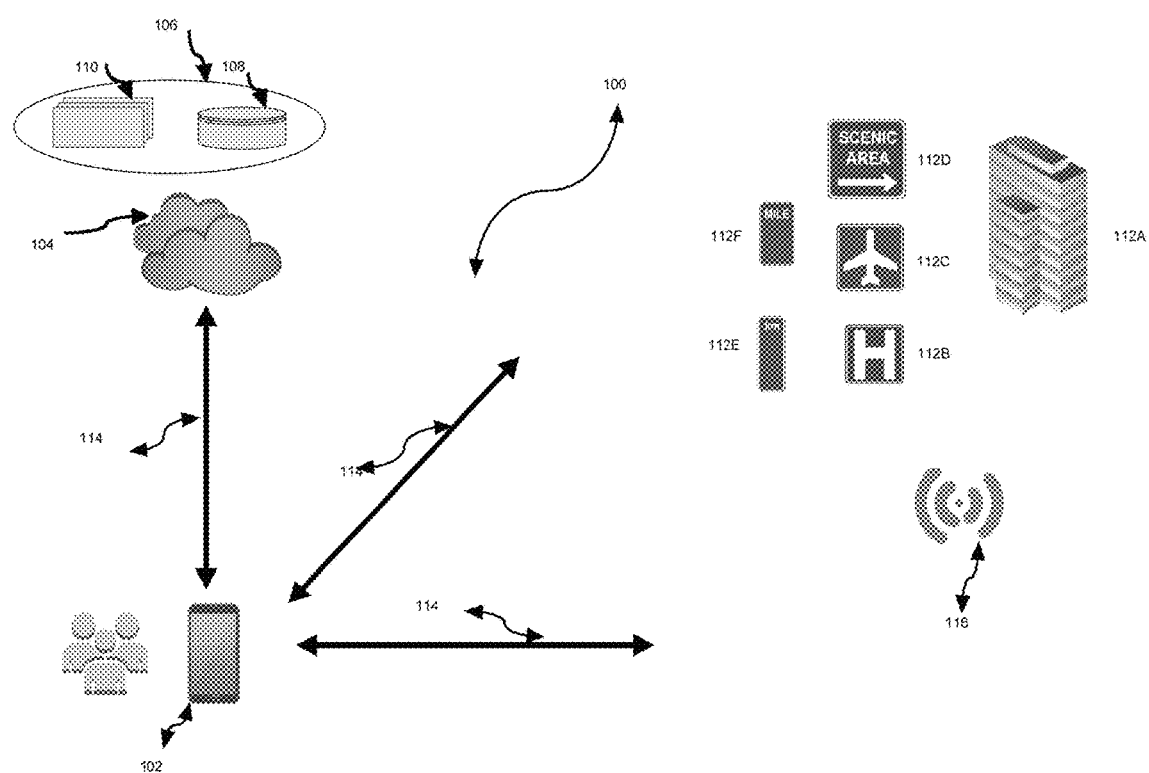
FIG. 1 is a global overview of the implementation of the system in accordance with the present disclosure.

In the following description, certain specific details are set forth in order to provide a thorough understanding of various implementations of the disclosure. However, one skilled in the art will understand that the disclosure can be practiced without these specific details. In other instances, well-known processors, hand-held devices, computer systems and well-known structures and processes associated with these devices have not been described in detail to avoid unnecessarily obscuring the descriptions of the implementations of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics can be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

Various implementations herein described relate to systems and methods for administering geo-tracking solutions and the routing of users from point to point in a geographical location. The systems and methods described herein can be employed in any suitable geographical system that relies on automatic determination from a mapping system. For example, the systems and methods described herein can be employed in a mapping system, which may include various geo-tracking services, social networking services, and geo-tracking capabilities. The system and method ensures the determination of return paths, and utilizes Artificial Intelligence to map location, time, and user preferences. The method employs analysis of, among other things, previous user trends, and will recommend locations that the user will identify as useful. For example, depending on previous spending trends, day of the week, and time of day, it will recommend locales in proximity to the user's route. The tracking service will also incorporate "awards" to be earned by the user as they input data into the system. The user's interactive input will be "age-agnostic," meaning the application will ensure incorporation and will be focused on both younger users and mature users.

The management of the data will be a platform that ensures the geo-tracking and return components are the primary focus. By leveraging existing resources, the data management components optimize the resource usage, which means that it will use either the local device (when there is limited external connectivity) or it will use remote resources (thus requiring remote compute access). Any of the above components may be amenable to access and manipulation by the user. Furthermore, performing a waypoint completion for the support or maintenance of a mapping system may include accessing and manipulating multiple components, and may require performing a route in a particular geographical order or according to a bread-crumb route.

A waypoint as used herein can refer to a landmark, point of interest, public place(s), an address, geo-tagged locations, buildings, structures, vehicles, historical places of interest, retail stores, and other geographic locations on the earth or on extraterrestrial bodies, such as the moon, the planets of the solar system, meteors, comets, and the like. A waypoint may also be or include instructions to a user to perform a task, such as a repair or replacement of a component, or taking a photograph such as for verification of location or completion of a task or route.

Some implementations herein described also provide management of routes for multiple users to travel between locations. For example, a location may be associated with each "bread-crumbed" point or waypoint in the tracking system, and the systems for administering user instructions and routing of users may geo-track the progress of each user directly, by means of tracking the location of the user, or indirectly by means of tracking and storing waypoints of the user. The tracking and storing is the primary focus because this will develop a "return home" path for the user. Additional functionality of the program includes, without limitation, tracking of service providers along the user's route. The service providers could themselves be "waypoints" that will assist the user in a safe return path. By accessing any information or having the user augment the database by providing pictures, waypoint anchors, or comments, the community will be "dynamic and interactive"—using base information that is part of the public domain (public churches, roads, intersections, store fronts, points of interests, etc.) and augmenting this public information by users (pictures of the above, comments, child friendly environments, physically challenged individuals, pet friendly environments, social media information, etc.).

Users will be able to adapt routing, return routing and preference depending on the filters outlined above. By locating each user, the application can determine an appropriate return route for each user, and sets or a set of waypoints in a list of users, based in part on the proximity of each user to a known and confirmed waypoint. The application interacts with social media and transportation companies (Uber, Lyft, public transport, roads) to ensure a user's return path to their home base is secured and efficient.

By way of example, suppose that a user engages "bread-crumbs." In this situation, the application is brought from an inactive state to an active state and, thus, additional actions relating to tracking the user's progress are required. In one implementation of the present disclosure relating to a user's instruction and a routing geo-tracking system, a management component detects that the user has been brought to an active state and can locate the user's progress. It begins tracking the user and establishing waypoints for performing the return route and begins actively establishing landmarks for a return journey. The management component generates instructions for directing the user to proceed to the location where a previous waypoint or landmark has been adjusted, and it can further generate instructions that would indicate clearly to the user how to advance to the next location. In some cases, the management component might locate two or more suitable waypoints and landmarks, and, depending on the relative locations of the user to the waypoints or landmarks and the locations of the "home base," bread-crumb will direct the users to specific locations of increasing importance and visibility to the return journey and respective controls thereof, based on their respective locations, so as to minimize the amount of time required to complete the return journey and assure a safe and known return path.

By way of another example, in the event a user has moved off their safe return path, the system and method of the present disclosure will track waypoints and landmarks that are easily accessible and visible in order to re-establish a return path. This will be particular helpful when walking, biking or driving a return route. In one implementation of a user instruction and routing system, a management component generates instructions to one or more users that include ordered steps for conducting routes. For example, a first step might be a waypoint that is a church, once the bread-crumb is dropped. In some cases, the system might divide the aforementioned routes between two or more users, in which case instructions may also include an instruction to wait until a route in the list is complete.

FIG. 1

FIG. 1 illustrates a user location tracking and waypoint tracking system 100 implemented globally. The system 100 includes a user management instrument 102 and remote user computing system 104 that has a user management database 106, which includes a storage device 108 and a user management processing module 110, that are utilized to leave geo-tracking markers along a route (referred to herein as "bread-crumbing"). A "route" contains public points of interest 112A-112F that include landmarks, geographical landmarks, and general mapped points of interest. As shown in FIG. 1, these public points of interest can include, without limitation, buildings, hospitals, airports, highway distance markers in kilometers and miles, and related signage as represented in images 112A-112F, respectively. The user management instrument 102 is also referred to in various implementations described herein as a user instrument 102, user management device 102, and user device 102.

Within a user's geographically chosen homing location, multiple waypoints will determine routes and can be used to assist the user in tracking their progress and ensuring proper routing is occurring, and that the routing optimization is focused on the route returning to the homing location. The major identifier points or landmarks 112A-112F are tracked in reference to the user's location, and assist in defining the return path, and the major points and landmarks will be used as waypoints. The system will optimize the use of these landmarks to assist a user in bread-crumbing a route. The use of the landmarks 112A-112F ensures a datum point or points (also known as waypoint or waypoints) to enable the system 100 so it can begin tracking return paths to the homing location. In this implementation, the return paths are identified via the existing landmarks, and the landmarks are used as waypoints 112A-112F, or other landmarks such as existing structures, points of interest, or mapping geo-tagged landmarks—therefore virtual points—may be used.

The user's management instrument 102 is used to communicate via wireless signals 114 to access the remote storage 108 and the module 110 compute capabilities in the computing system 104. The instrument 102 can take any form of a portable communication and display device, such as a cell phone, tablet, personal computer, portable smart watch, and the like as described in the implementations. Portability includes hand-held devices or devices mounted on or in a vehicle, such as GPSs. In general, the user instrument 102 or interface device can be any suitable device for display or presentation of instructions to a user regarding a mapping system. There will be optional functionality to assist the visually impaired with high quality audio tracking and feedback systems. Feedback to the geo-marked waypoints 112A-112F is managed via a user interface on the user instrument 102 that identifies Wi-Fi hotspots 116, the landmarks 112A-112F, as well as any pertinent third-party generated waypoint (geo-tracking signal) and public or private signals. The routes can be shared with other users to assist others in determining routes, establishing waypoints, and assisting other users with optimized routes.

As previously described, the user interface will reside on the user instrument 102, such as a wireless display device, tablet, smartphone, smart watch, laptop, or any wearable display device. The user instrument 102 will receive instruction from the user computing system 104 to display a forward path and begin seeding a return path for the user by back-tracking the markers that were left behind on the outgoing path. These markers are used as the waypoints to assist in the return routing. The geo-markers will correlate any physical descriptor that matches any highly visible or public landmark or easily identifiable places (coffee houses, free Wi-Fi hotspots, etc.). For example, the user instrument 102 will be instructed to display outgoing and "seeding" return paths according to ease of landmark identification. It will prioritize seeding a return path based on density of landmarks, and will determine the return path based on a priority that is determined by how easily identifiable each geo-marked waypoint is to the user. The waypoints will correlate with geo-tracking points left behind by the user, or they will be automatically dropped.

The system software will generate digital identifiable waypoints to ensure path tracking and to establish location. The software will indicate each waypoint with the landmarks. Some of the landmarks will be privately owned, other landmarks will be highly visible public points, and other landmarks will be referenced from a user's social media footprint. Each landmark will correlate with a geo-marked waypoint. The user will receive instructions sent from the user computing system 104 that will dictate the status of the route (return, outgoing, tracking engaged, waypoint verification, social media access, etc.). Once the route is complete, the software will determine the return route to the user-identified "home position." An indication of the complete return route will be sent by the remote user computing system 104 to the user instrument 102, and the user will take appropriate steps to engage or reengage the return route and share the route and waypoints with other users.

Within the user tracking system, individual or multiple identifiable landmarks 112A-112F may be used for waypoint identification along a single route, or each waypoint may consist of an individual route. For example, in a particular example route, individual waypoints may be identified in a routing series at several such identifiable landmarks, such as landmarks 112A-112F. Each of the waypoints or waypoint routes 112A-112F can communicate a status of the individual waypoint location (e.g., "complete," "in progress," "incomplete,") to the remote computing system 106.

The user instrument 102 is structured to receive instructions from the remote user computing system 104 and to display a list of waypoints or waypoint instructions to the user via a display screen 116 of the user instrument 102. For example, the user instrument 102 can be instructed to display a waypoint on the return route first according to an order of priority, such as high waypoint visibility, which is the waypoint that is listed first. Subsequent waypoints are then listed by an order of distance from the user's home location. In some cases, a user's location may be based on a known landmark or current waypoint and, thus, progress on the existing route. The geo-tracking of the user will result in the user's relative location in connection with the user's return route to their home location or other destination. The geo-tagged elements will constitute a waypoint or waypoints.

For example, if a user completes a route, and then chooses to terminate the route and engage rerouting, the system will complete a waypoint from the waypoints 112A-112F along a first electronic route 112A-112F. The user's location may be based on the location on the proximity to the series of waypoints that were identified 112A-112F. The above case assumes that the "waypointed" routes at the second and third routes, with their determined waypoints (either as geo-tagged waypoints or public/non public landmarks that are used as waypoints) 112A-112F, are equally available. The user management route will predict the user's location after retracing a bread-crumb waypoint in the first route, which may be a route adjacent to the first waypoint route. However, the user management route may be optimized for a fastest return route, and can list the most logistically convenient waypoint and the return path determined to be the easiest (minimizing geographical or high traffic obstacles) return path to the home location, which will be at the second optimized route and will use a new set of waypoints selected from the waypoints 112A-112F.

Route instructions may be transmitted to the user instrument 102 by means of any suitable wireless connection or wireless network, and in some cases, it may include transmission over a mobile phone network, e.g., by text message.

When a route is complete at an electronic waypoint, such as the first "waypointed" route, an indication that the waypoint on the route is complete can be provided to the remote user computing system 104. The indication can originate from one or more sources, according to various implementations described herein.

In some cases, an indication that a waypoint is complete can originate from the route on which the waypoint has been identified. If the routing is a well-known route, for example, the waypoints on the route can send data to the remote user computing system 104 to indicate that the waypoint is complete at the time of reaching the waypoint or upon completion of the route, at which time ALL waypoints will be complete. In some cases, the waypoint may include inputting one or more commands or instructions that may cause the route to relay the one or more tracking instructions to the remote user computing system 104. This ensures user compliance with the instructions and proper routing according to the list of waypoints generated at the onset of the engagement by software.

In some cases, some or all of the waypoints in a route can be prepared with instructions to communicate any qualifying markers or access to a user management element. The access would be so that completion of a waypoint by a user would tend to automatically trigger the reroute to relay an indication of return to the home path; thus, once the user goes back to a waypoint, the system would identify a possible routing back to the home base. A qualifying user modification or access might include any modification or side access to the route, and it may be limited to modifications that result in a change in route.

In some cases, the remote user computing system 104 can monitor a status of waypoints on the route such that when a route is completed at a determined waypoint, such as a first landmark 112A, a monitoring tool that monitors the status of the route will indicate a change in status corresponding to the user reaching a waypoint. For example, the remote user computing system 104 will detect a result of a user reaching a waypoint by monitoring the routing as it compares to the set of waypoints, routing product, or output of a route at a location where the waypoint is found, and comparing the route to an expected route associated with a complete waypoint.

By way of a first example, suppose that the first route includes a church or a publicly visible point, and this first waypoint is used in a route to ensure a return route and to leverage well-known waypoints to ensure a return route. By monitoring waypoints along the route and either digitally or physically indicating anchor paths, the application will ensure a return route.

By way of a second example, suppose that the first route includes a waypoint that the user does not recognize; the user will request verification to ensure the return route is correct. By monitoring the progress as it pertains to waypoints, the user will be required to correct their route visually and then verify via the bread-crumb system 100.

In some cases, the remote user computing system 104 will receive an indication from the user instrument 102 that a waypoint is complete. For example, the user computing system 104 is capable of two-way communication, and includes an input device such as a touchscreen, keyboard, mouse, track pad or trackball, voice recognition, switch, or other suitable input device to receive a user input indicating the completion of a waypoint. In some cases, the user instrument 102 can also include a sensor, such as a camera, RFID scanner or other radio frequency receiver or transponder, or barcode or QR code scanner (or other comparable code scanner) for sensing information about one or more of the waypoints on the route.

By way of a first example, where the user instrument 102 includes a camera, detecting the completion of a waypoint may include capturing an image of a waypoint or landmark 112A-112F by the user instrument 102 after a waypoint has been reached, to determine an "actual visual state" of the route. The system 100 compares the "actual route" to an "expected route" and the respective waypoints to determine whether the actual and expected routes match.

By way of a second example, reaching a waypoint successfully can cause the system 100 to display or transmit an indication to the user that a waypoint has been reached or completed, such as a visible code, which may be machine-readable, human readable, or both. In the alternative or in addition to the foregoing, a radio frequency (RF) signal or other suitable signal is generated that can be received by the user instrument 102 or transcribed by the user to the user instrument 102.

Similarly, an indication that a waypoint has been missed or performed incorrectly can be provided to the user computing system 104. For example, if a user has strayed from the intended route and missed a waypoint in a route, such as one of the geo-tagged landmarks 112A-112F, the user computing system 104 will detect that an actual state of the route differs from an expected state. In response to the detection of a different state, the system 104 will provide an alert to the user, such as sounding an audible alarm, generating a visual display or tactile sensation, or any combination of the foregoing. In some cases, the user computing system 104 may generate a new waypoint list that includes one or more mitigating waypoints or a rerouting process for undoing the incorrectly performed bread-crumbed route, or for mitigating additional errors that might propagate from the incorrectly performed route.

For example, suppose that reaching a waypoint required the user taking a route, and the user incorrectly deviates from the returned bread-crumbed route by a certain amount. The user management component may receive an indication from a waypoint along the route indicating a misrouting and providing instructions to bring the user back to their return route. As a mitigation step, the user computing system 104 may generate an additional instruction to change the user routing by a certain amount of corrected routing and ensure the amount of deviation is within return routing tolerance, and it may insert the additional instruction at or near a top of a list of waypoints.

Similarly, an access or modification that is not prescribed by the waypoint list, or that has been performed in deviation to an ordered route or in deviation from the suggestion instructions on the waypoint list, can be detected and communicated to the user computing system 104. In some cases, the user computing system 104 may add or delete instructions from the routing waypoint list in real time to accommodate adjustments to the management of the return route.

FIG. 2

Figure 2:
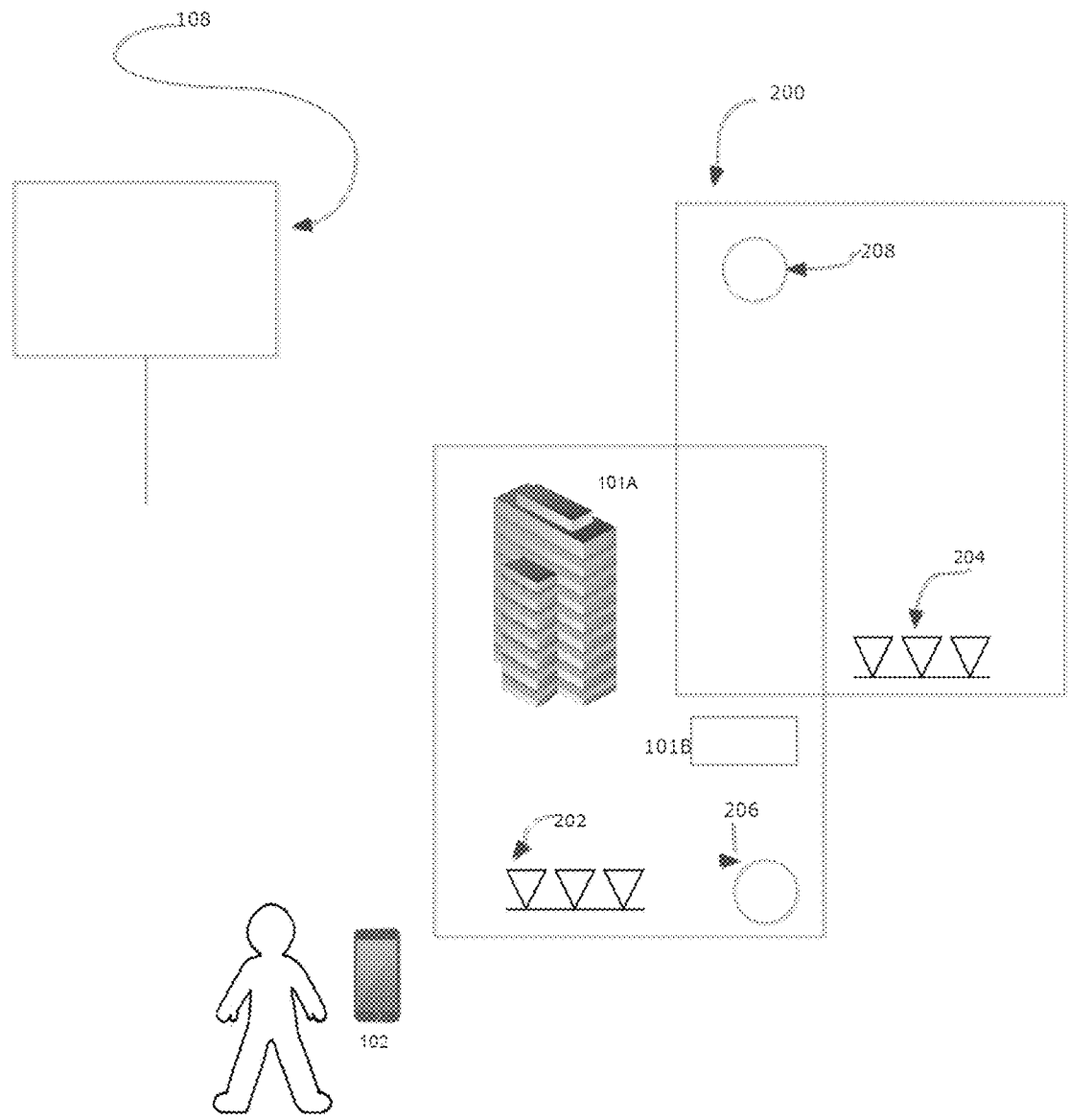
FIG. 2 illustrates a representative implementation of a user tracking system and return to point of origin in accordance with the present disclosure.

FIG. 2 illustrates electronic component automatically identified waypoints as mapped and recommended by social media, or public places of a geography, and a system 200 for administering a user return path as instructed, in accordance with the various implementations of the present disclosure. In the system 200, a user management component 108 communicates instructions to the user's management instrument 102 indicating a return route of interest per visual or digital map indicators corresponding to waypoints located along the identified return route.

For example, suppose that a user management component 108 has generated a route requiring active user input at a first waypoint 112A and at a second waypoint 112B, in that order. While the first waypoint 112A is active and becomes identified as incomplete routing, the user management element 108 will cause various indicators to activate on the user's management instrument 102, which will have the effect of communicating to the user a requirement to follow a corrected routing. For example, a first indicator 202, or "route in process" indicator, might illuminate on the user's management device 102 as shown in FIG. 2 at the first waypoint (bread-crumbed indicator) 112A when an access or goal at the first waypoint 112A is achieved. The next route direction in the recommended bread-crumbed route is then generated and sent for display to the user management device 102. In some cases, a second virtual or electronic indicator 204 might illuminate at a location proximate to, but more visible than, the first waypoint 112A, which will give the user the correct orientation to return to the original route.

In some cases, any of the first and second indicators may include an audible alarm, virtual indicator, virtual achievement badge, or a message. In some cases, any of the indicators may also include a display for relaying specific directions and route orientation regarding the user routing, such as methods of returning to the bread-crumbed route, or may include a waypoint image 101A or an interface such as a terminal, switch, touchscreen, touchpoint on the screen 101B or other suitable input means to verify completion and route correction by the user. Upon completion of a route, the user management component 108 can change the indication on the user management device 102. For example, a "waypoint complete" indicator 206 would be strobed "on" when a user has been successful at performing a bread-crumbed route, and a "routine process" indicator 208 might be activated at a second, alternate route showing an active routing component, such that the indicators 206, 208 serve to direct a user from the first waypoint (bread-crumb) 112A to the second waypoint 112B.

FIG. 3

Figure 3:
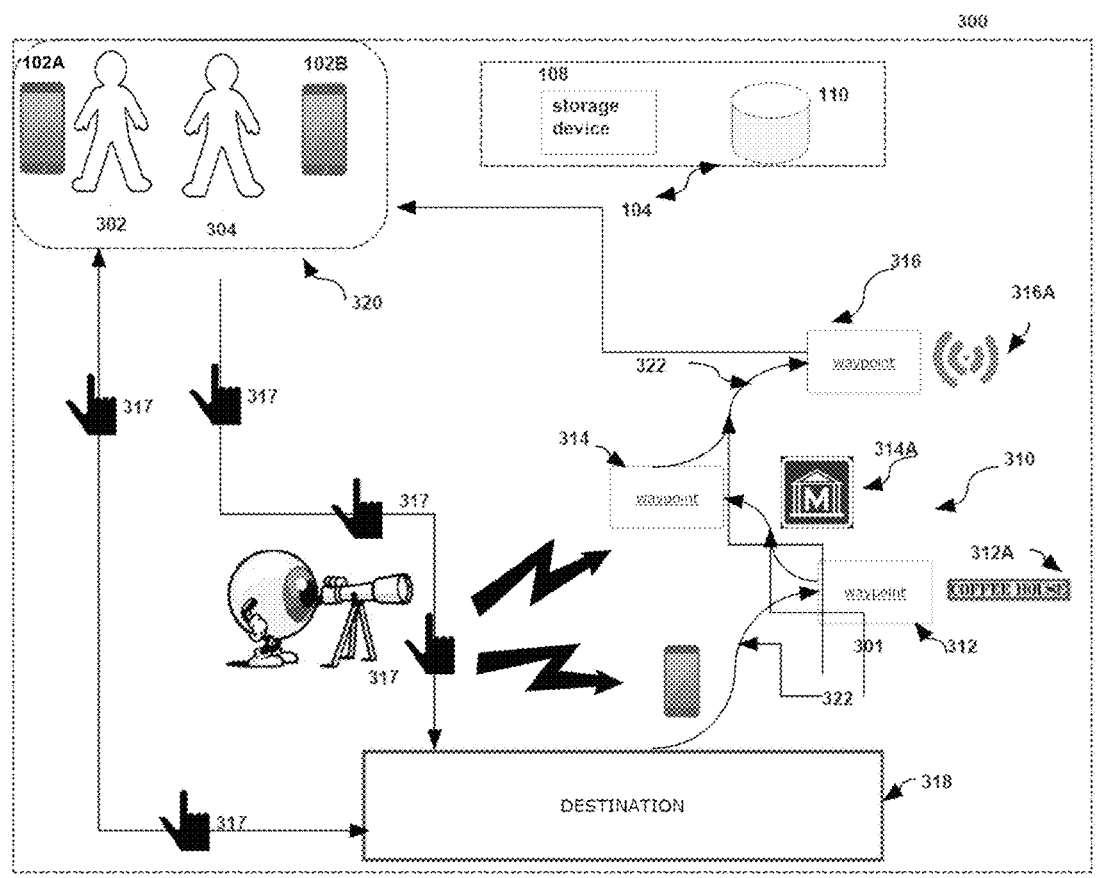
FIG. 3 is a top-down diagrammatic representation of a system for administering feedback to the user in accordance with the present disclosure.

FIG. 3 is a top-down diagrammatic representation of a system 300 for administering user instructions and route finding for multiple users 302, 304 in a user defined route 317 that guides the users 302, 304 via waypoints to the users' predetermined starting location, in accordance with a representative implementation of the present disclosure. In the system 300, the first user 302 and the second user 304 each have their own respective management devices 102A, 102B structured and adapted to receive instructions from the remote user computing system 104, which includes the storage device 108 and the user management processing module 110 as described above with respect to FIG. 1.

The remote user computing system will include storage, databases, and compute capabilities. In some cases, the user management processing module 110 can be configured to track a physical location of each user 302, 304. Tracking the physical locations of each user 302, 304 by the user management processing module 110 can also be done by communicating with one or more electronic devices in the possession of each user, such as each management device 102A, 102B. In some cases, each management device 102A, 102B can contain a radio-frequency receiver (RF receiver) configured to detect signals from one or more alternate communications transmitting systems focused on technologies such as radio-frequency identification tags (RFID tags), RFQ, public locations, and publicly identified Wi-Fi sites.

A sample route 310 is illustrated in FIG. 3 to include three waypoints 312, 314, 316 and a destination 318. It is to be understood that a route can consist of only one waypoint, such as route 301, or multiple waypoints, as well as a destination and a starting point or home location. In some situations, a route can be a single pathway or it can be selected from among multiple pathways in which the waypoints are reordered according to the temporal order in which the waypoints are encountered or are expected to be encountered by the user.

In this implementation, each waypoint 312, 314, 316 has associated with it an identifier 312A, 314A, and 316A. In some cases, the identifiers 312A, 314A, and 316A will be pre-positioned along the route and displayed in the route map to permit the management devices 102A, 102B to determine a location based on multiple differing signals, e.g., by triangulation. For example, an arrangement such as a grid of waypoints may be spread in any geometry throughout all or a portion of the tracking system, and the system will delete or drop guidance waypoints as the user moves along the not-yet-refined or defined route or routes.

In some cases, priority among various routes being traveled by a user will be determined based on proximity; however, a variety of priority criteria may be used. For example, a high priority route near obvious landmarks or sponsored businesses and automatically generated public waypoints will be set as the highest priority return route. Generally, an order of priority of routes can be one from among an order from highest priority to lowest priority (or easiest route depending on the chosen mode of transportation), proximity of routes to the user's location, such as the nearest associated route, an order of precedence among a group of related routes or routes near the user's outbound routes, and a specific effort required by the user or based on user expertise and ability to travel a route.

An order of precedence can include an order of routes that cannot or should not occur in a different suggested track. For an example of an order of precedence, component waypoints need to be logical and identifiable locations, such as popular sightseeing locales, public establishments, and options as generated by other social media and suggested sites. Thus bread-crumbs will need to "pick-up" the dropped identifier so as to move the user forward toward the next waypoint or "bread-crumb." Because of limits on a specific user's burden or expertise, and because a route that may have limits in both the geography or transportation challenges or both, certain routes may require differing capabilities, skill levels, or some understanding of the territory. Routes that may include any special considerations will be indicated to the user on the user's management device 102. Also, the software will continually update the user on effort or cost of transportation to return the user to the determined starting or home point. Similarly, routes requiring a user's technical specialty may be prioritized for and displayed to those users having any particular skill or limitations that may be of consequence on the "bread-crumbed" route. Examples include routes associated with large elevation changes, numerous road crossings, and little access to public transportation, and little to no access to online taxi services (Lyft, Uber, Hailo, Sidecar, etc.), in which cases the system would use the stops as waypoints to ensure they are considered as "bread-crumbed" route markings).

Where multiple routes may have the same priority or effort, the user management element 108 or processing module 110 can determine the nearest or easiest return route in a list based in part on a distance between each waypoint associated with one or more return routes. As a result, it can direct each user 302, 304 at least in part according to the nearest pending route, including splitting a list of routes to the end or home point as defined individually by each of the users 302, 304.

For example, suppose that a list of three waypoints 312, 314, 316 has been generated, requiring the user to access an indicator 312A, 314A, 316A along the route 310 that each of the waypoints 312, 314, 316 has been reached. The system 300 will automatically make this determination and provide an indication to the users 302, 204 as each waypoint is reached. Accordingly, the list of routes can be divided among the route that was initially identified within the user limitations. The users 302, 204 will be instructed at their respective management device 102A, 102B to proceed to their respective route at the first waypoint 312 and then to the second waypoint 314.

The user management processing module 110 can further generate a path by determining the next-closest position of any route in the list of waypoints or bread-crumbed positions. For example, the users 302, 204 will be directed along a return route from the destination 318 to the starting point or home location 320 along a first path 322 in order to efficiently reach the second and third waypoints 314, 316 in series, as shown in FIG. 3. In some cases, a path, such as path 322, can be indicated to its respective user via a path illustrated on a display that is a component of the user management device 102, and via text or audible instructions based on known or labeled coordinates.

FIG. 4

Figure 4:
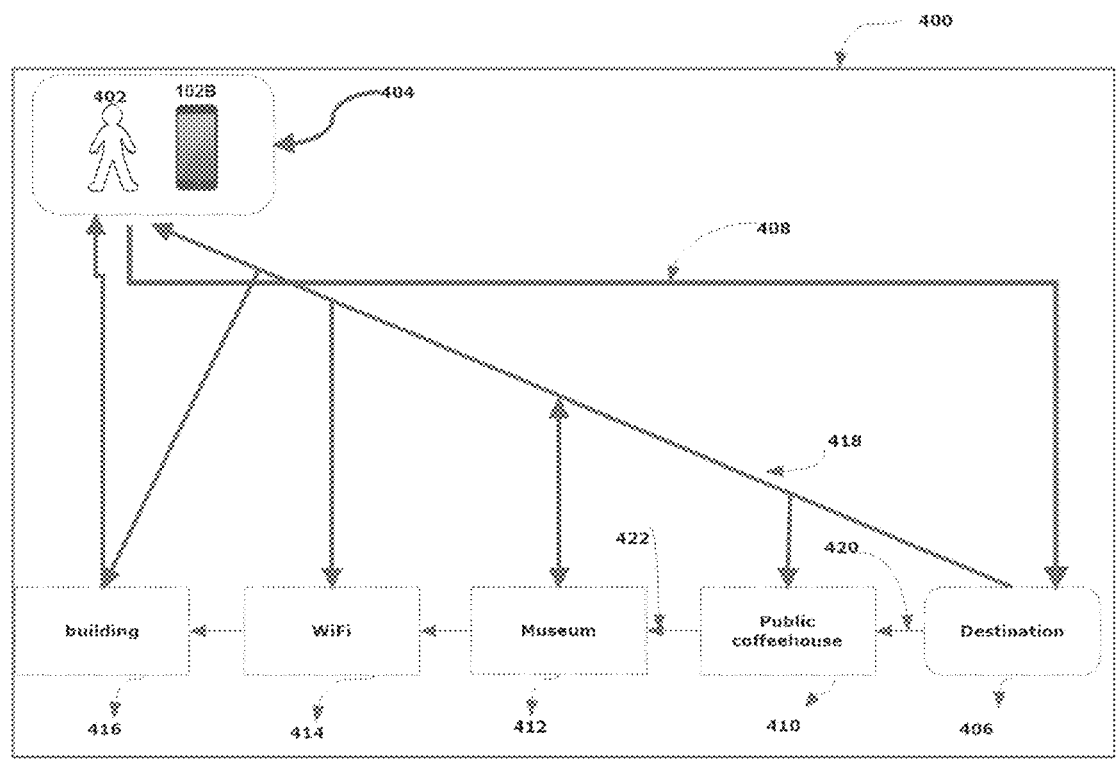
FIG. 4 is a top-down diagrammatic representation of a system for administering system logic while determining geo-tracking location in accordance with one implementation of the present disclosure.

FIG. 4 is a diagrammatic representation of a routing system 400 that administers user instructions and route finding for a user 402 by way of indicators both visible and invisible within the routing system 400 in accordance with one implementation of the present disclosure. The system 400 may reside within the remote user computing system 104, which includes the storage device 108 and the user management processing module 110 as described above with respect to FIG. 1. Alternatively it may be included in the user management device 102, or aspects of the system may reside in both the remote user computing system 104 and the user management device 102.

Initially the user 402 travels from the starting point or home location 404 to a destination 406 via an initial path 408. As the user 402 moves along the initial path 408, the user management device 102 tracks the user's location along with various waypoints, including a building public coffee house 410, a museum 412, a Wi-Fi location 414, and a building 416, as representative examples, to be used in determining one or more possible return routes.

In a first stage of the system 400, a return route 418 is identified by a series of visible or invisible indicators that starts with a path between a first waypoint, in this case the public coffee house 410, and a second waypoint, which is the museum 412. The indicators may be used, for example, when the user reaches the initial destination location 406 and the bread-crumbed return route 418 has been engaged. In this first stage of the return route, a path 420 is mapped on the user management device 102 between the destination 406 and the first waypoint 410.

In a second stage of the system 400, a second path 422 can be illuminated between the second waypoint 410 and the third waypoint 412. These indicators may be switched on, for example, when the second path 422 to the second waypoint 412 has been completed. Successive stages of intermediate paths between subsequent waypoints will follow this same process until the user 402 has returned to the starting point 404.

Visible, virtual indicators on the personal management devices 102 for routing the users between waypoints and landmarks along a route in a mapping system can take a variety of forms including, without limitation, lighting tracks in the accomplished milestones, audible or visual or tactile verification of waypoints or bread-crumbed places, visual display of orientation and direction to a waypoint; illuminated designs such as arrows, chevrons, pixel animations, or other suitable directional indicators. Indications of various types can be used to notify the user that a particular waypoint or component requires user attention so as to assure that it was cleared as a return indicator. One such indicator includes signaling of a particular color or pattern of illumination on the user management device 102.

Visible, virtual indicators for routing the users between waypoints and landmarks in a mapping system can take a variety of forms including, for example, lighting tracks in the accomplished milestones, verification of bread-crumbed places, visual display of orientation and direction of waypoint; display devices such as any identified waypoint; illuminated designs such as arrows, chevrons, pixel animations; and/or other suitable directional indicators. For example, where the bread-crumb route is a neighborhood in a city, signaling connected with individual electronic components such as any bread-crumbed anchor point may be used as visible indicators. Indications that a particular component requires user attention so as to assure that it was cleared as a return indicator and may be achieved by utilizing signaling of a particular color or pattern of illumination.

FIG. 5

Figure 5:
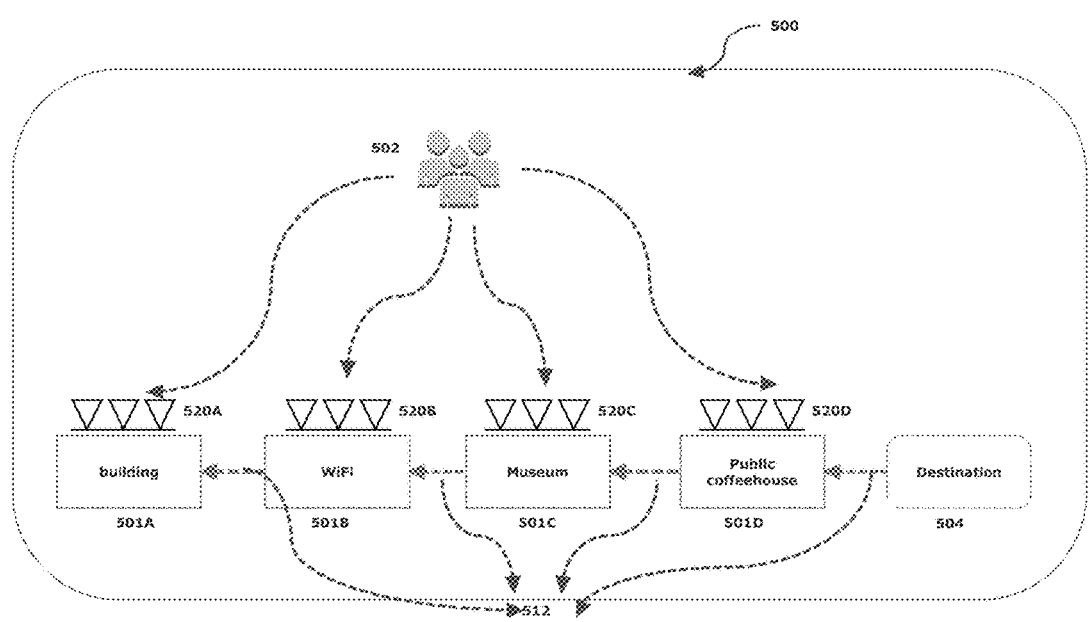
FIG. 5 is a high-level block diagram of an example system for administering tracking and user input in accordance with the present disclosure.

FIG. 5 illustrates an example system 500 for administering user instructions and route finding for users 502 undertaking routes at waypoints 501A, 501B, 501C, and 501D that ends at a destination 504 in a mapping system of a geographical location, in accordance with the present disclosure. For example, suppose that a user has recently completed a partial route at a first waypoint 501A, and a second waypoint is queued in the system 500 requiring user verification at a second waypoint 501B of the bread-crumb route. The system 500 may employ indicator signals 520A, 520B, 520C, and 520D on the user interface on the user management device 102 to indicate whether a waypoint requires user attention (either staying on an optimal route or going off route). In the example case, a first indicator light 520A on the user management device 102 can be disabled at the first waypoint 501A or put in an inactive mode or illuminated a color to indicate an inactive mode (e.g., red), while a second indicator 520B at the second component 501B can be illuminated or put in an active mode or active color (e.g., flashing green) on the user management device. In addition to, or instead of, the indicator signal, the system 500 may employ path indicators 520A-520D, such that a path signal calls attention to a contiguous path 512 between the first waypoint 501A and the second waypoint 501B. In some cases, path signaling may be used to direct a user to a next waypoint that is not immediately visible from the location of a previous waypoint; for example, routing around corners or a long distance in a long stretch of road or lack of visibility to the next waypoint. The user will be signaled by landmarks, and the system 500 may utilize other indicators (restaurant addresses, Wi-Fi points, etc.).

FIG. 6

Figure 6:
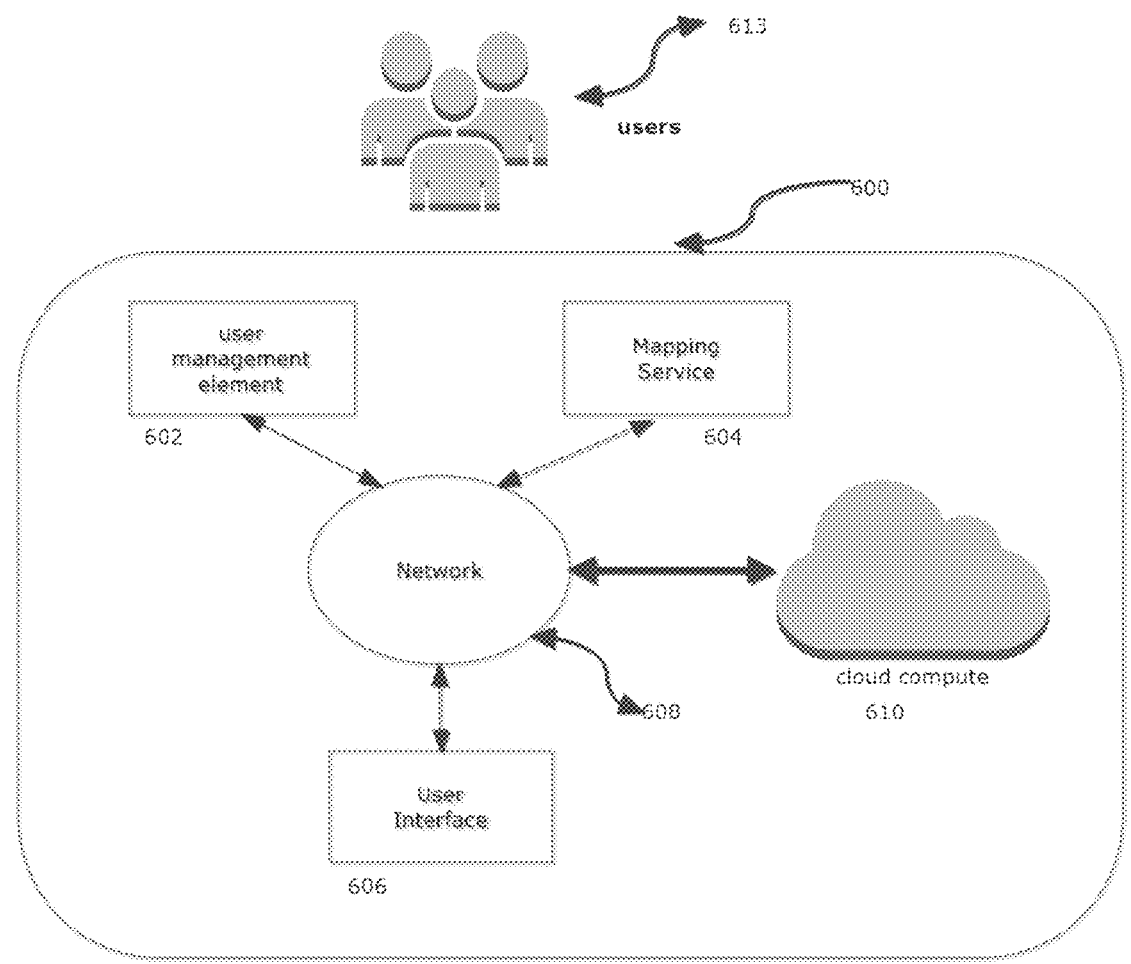
FIG. 6 is a first example process for geo-tracking instructions to a user and geo-tracking return instructions to a user in accordance with the present disclosure.

FIG. 6 illustrates a high-level block diagram of an example system 600 for administering user tracking instructions and route finding for users 613 in the mapping and tracking system 600, as in the example systems shown in FIGS. 1-5, in accordance with the present disclosure. In the example system 600, a user management element 602, a mapping service 604, and a user interface 606 associated with the user management device 102 are in communication with one another via a network 608 and cloud compute 610 that relays instructions and data between each pair.

For example, the user management element 602 can send instructions to the mapping service 604 to query the mapping/social media system for routes that can be used, such as waypoints having known landmarks, or QF sensors indicating waypoints, public/privately recognized waypoints, or publicly advertised landmarks. The mapping service 604 can return information detailing the bread-crumbed routes for route identification to the user management element 602, which can in turn generate a list of routes that have been "bread-crumbed" and push the list of waypoints to the user interface 606. In some cases, the user interface 606 is a mobile device capable of being carried by a user, such as the user management device 102, and in other cases the user interface 606 can be any suitable means of directing a user to move to a route, as detailed above in reference to FIGS. 1-5. Detailed example systems for administering user instructions and route finding are described below with reference to FIGS. 7 and 8.

FIG. 7

Figure 7:
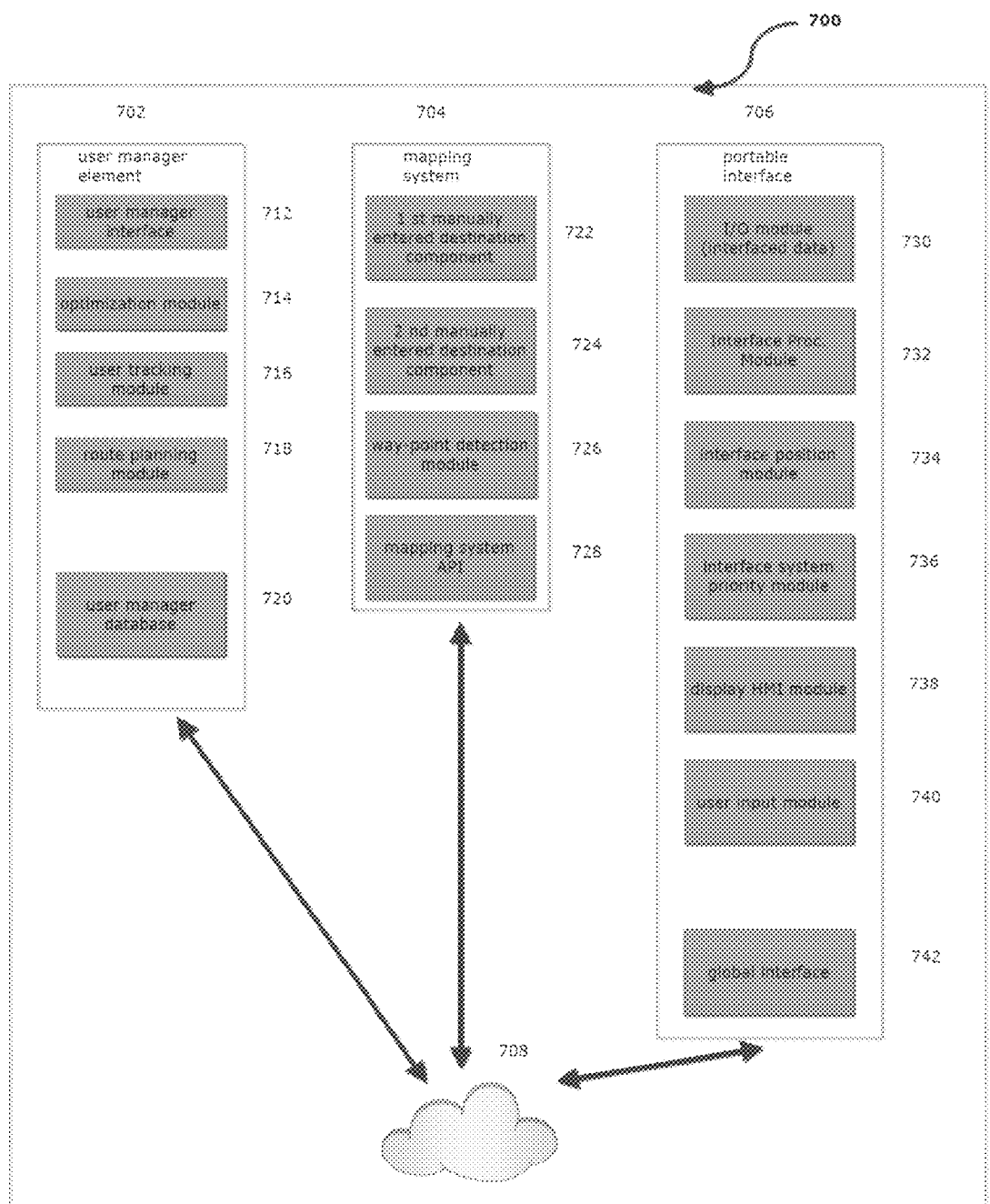
FIG. 7 illustrates a third example process for providing optimized return paths and instructions to a user in accordance with the present disclosure.

FIG. 7 is a block diagram illustrating a first example system 700 for administering user instructions and route finding for a user between waypoints in a mapping system, as described above in reference to FIGS. 1-5, in accordance with the present disclosure. For example, the system 700 can include a user management element 702, a mapping system 704, and a portable interface 706, which can include a tablet computer, laptop computer, smartphone, wearable display device, or any other suitable portable electronic device, such as the user management device 102, that can be used by a human user to communicate with the user management element 702. A network 708 can connect any or all of the above elements, devices and systems. The user management element 702 can include any or all of, or any suitable combination of, a user manager data I/O module 712, a processing module 714, a user tracking module 716, a route-planning module 718, and a user management database 720.

The mapping system 704 can include at least two manually operable components, including a first manually entered destination component 722 and a second manually entered destination component 724, but may generally include a large number of components that are amenable to human user access and modification for automatic referencing for return route identification. The mapping system can also include a waypoint detection module 726 for detecting when and where user home routing and return route identification has occurred, and a mapping system API I/O module 728 for communicating information from the mapping system to the user management element 702 or the portable interface 706 or both via the network 708.

The portable interface 706 can include any or all of, or any suitable combination of, the following elements: an interface data I/O module 730 for communicating information to and from the user management element 702 and the mapping system 704 via the network 708; an interface processing module 732 for processing data and executing stored breadcrumbs, an interface position sensing module 734 for enabling the detection of a physical location of the portable interface by, for example, the user management element 702; an interface/system compliance sensor module 736 for enabling the detection of user compliance with return routing and waypoint visual identification; a display module 738 for presenting information to a user; a user input module 740 for receiving user instructions and confirmation data, and an interface instruction buffer 742 for storing instructions from, for example, the user management element 702.

The modules making up the user management element 702 can each include instructions executable by the processing module 712 to receive information from the mapping system 704 regarding routes, generate a list of suggested routes, and communicate the return paths to the portable interface 706. The modules making up the portable interface 706 can, likewise, present the instructions to a user, track user location and progress, and communicate with the mapping system 704 to determine if and when a route is complete or the user has gone off track. In various other implementations, a portable interface is optional or may be supplemented with an instruction system in addition to or instead of the portable interface.

Figure 8:
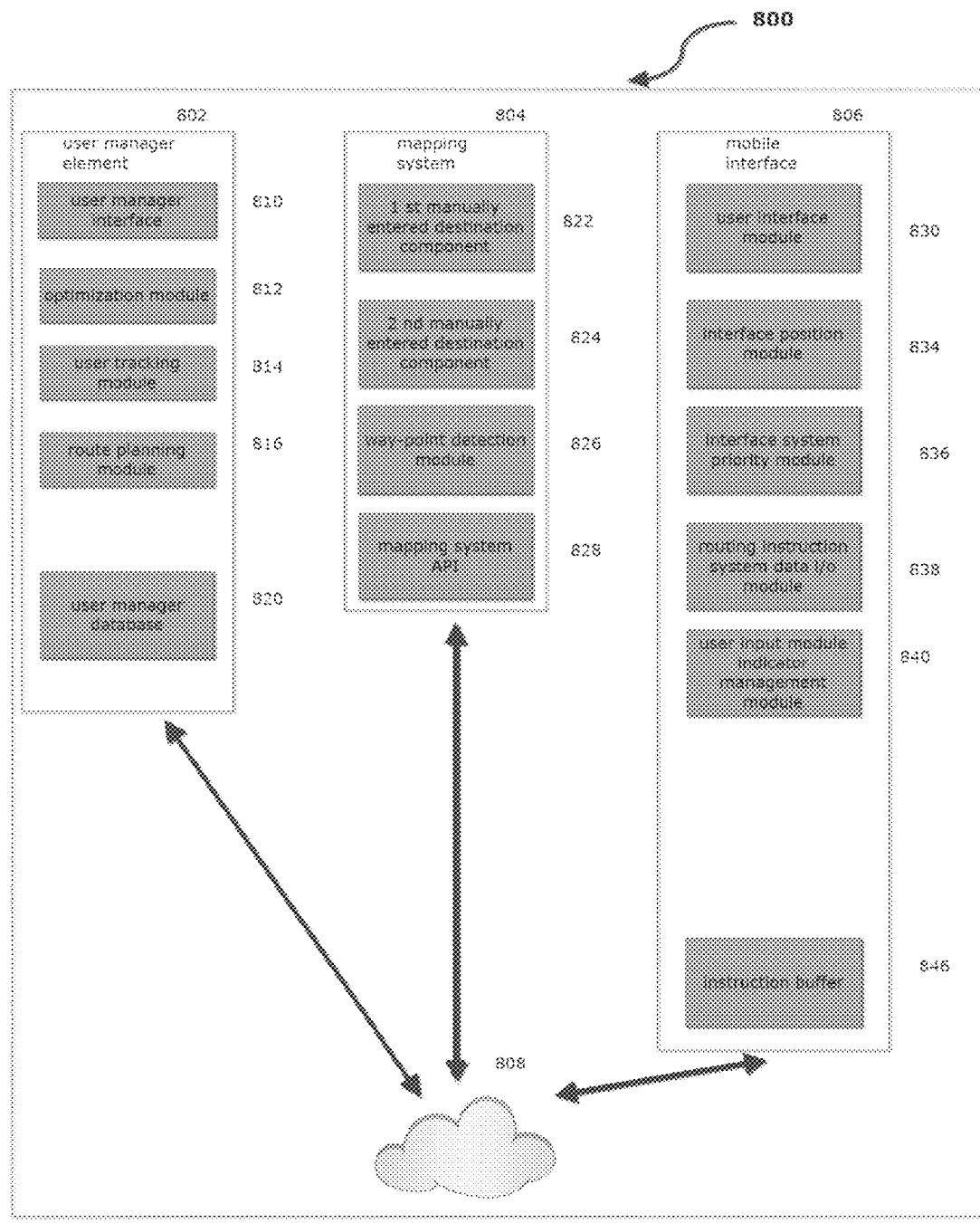
FIG. 8 illustrates an environment in which various aspects of the present disclosure can be implemented.

FIG. 8 illustrates an environment in which various aspects of the present disclosure can be implemented. More particularly, FIG. 8 is a block diagram of a second example system 800 for administering user instructions and route finding for a user between waypoints in a mapping system 804. The system 800 includes a user management element 802, the mapping system 804, and a mobile interface system 806, which may optionally replace or can operate in addition to a portable interface like the portable interface 706 of the system 700 shown in FIG. 7. A network 808 connects any or all of, or any suitable combination of, the above-referenced elements and systems.

As in the system 700 shown in FIG. 7, the user management element 802 of the system 800 can include any or all of, or any suitable combination of, a user manager data I/O module 810, an optimization module 812, a user tracking module 814, a user tracking module 816, and a user manager database 820. The mapping system 804 can also include any or all of, or any suitable combination of, at least two manually inputted user route components including a first manually entered destination component 822 and a second manually entered destination component 824, but may generally include a large number of components that are amenable to human user access and modification. The mapping system 804 can also include a waypoint detection module 826 that detects when and where user access or modification of a route has occurred, and a mapping system data I/O module or API 828 that communicates information from the mapping system 804 to the user management element 802 as well as the instruction system 806 via the network 808.

The instruction system 806 can include any or all of, or any suitable combination of, the following elements: a user interface module 830 that provides instructions to and receives instructions from a user; a route sensing module 834 that detects access and modification at a component of the mapping system 804 by a human user; an interface system priority module 836 that detects whether a manually entered waypoint or route destination corresponds correctly with an instruction by the user management element 802; a routing instruction system data I/O module 838 that computes instructions and data with the user management element 802 or the mapping system 804 or both via the network 808; and a user I/O module indicator management module 840 that generates and presents visible, audible, tactile, or other suitable indicators to a user. The mobile interface 806 can also include an instruction buffer 846 that stores executable routing instructions.

FIGS. 9-10

Figure 9:
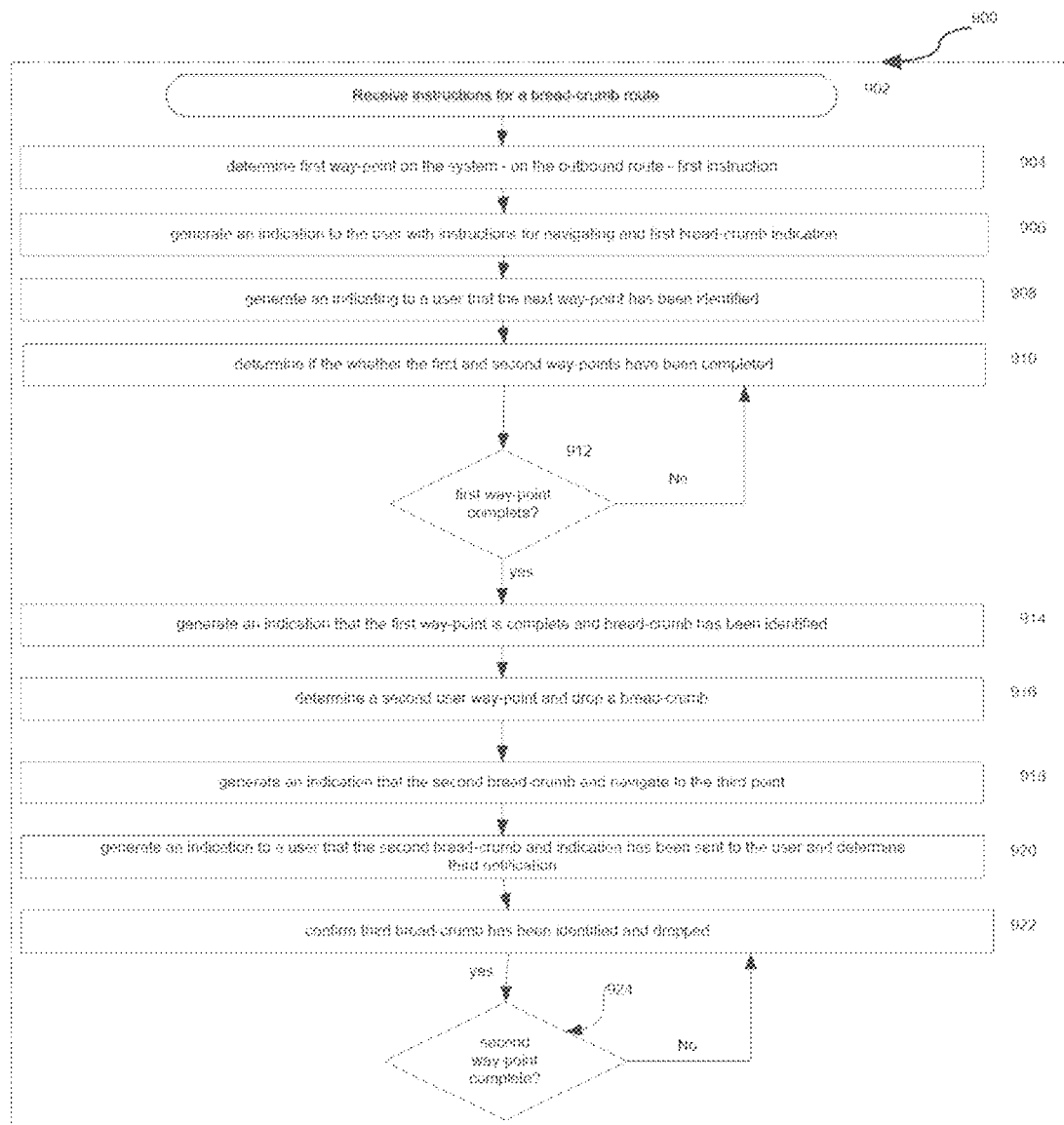
FIG. 9 illustrates an example process for providing user instructions or providing route-finding management to a user or users in accordance with one implementation of the present disclosure.
Figure 10:
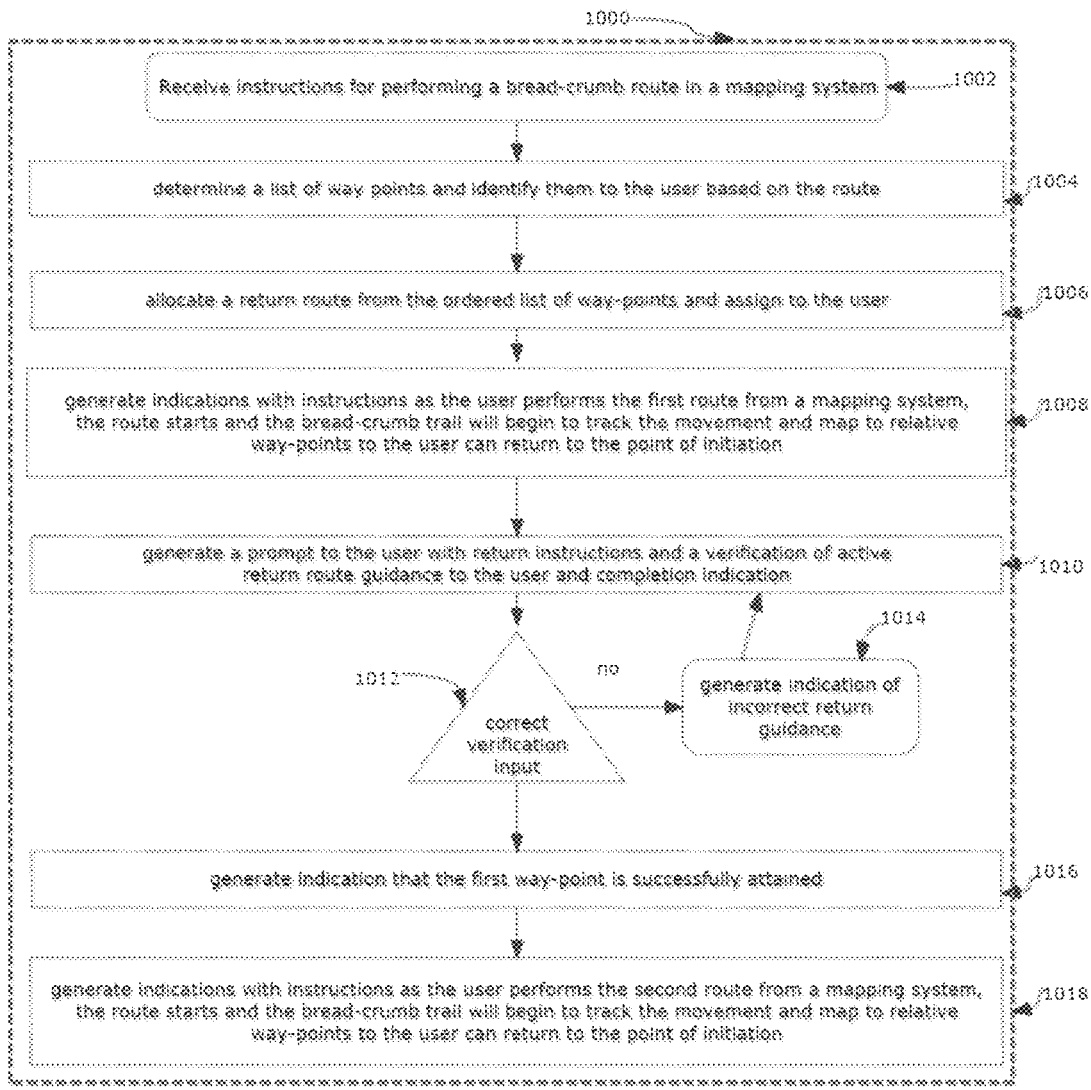
FIG. 10 illustrates a second example process for providing user instructions to a user in accordance with another implementation of the present disclosure.

FIGS. 9-10 illustrate example processes 900, 1000, and 1100 that provide user instructions and route-finding management to a user or users. Some or all of the processes 900, 1000, and 1100 (or any other processes described herein, or variations, and/or combinations thereof) may be performed under the control of one or more computer systems; both cloud and privately hosted configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 9 illustrates a first example process 900 that provides user instructions to a user. Aspects of the process 900 may be performed, in some implementations, by a system similar to the systems 600, 700, and 800 shown in FIGS. 6-8. The systems may be implemented for applications and in environments such as those applications and environments shown in FIGS. 1-5.

In this aspect of the present disclosure, the process 900 includes a first step 902 of receiving instructions for determining, identifying or performing one or more waypoints in a mapping system (902). Based on the instructions, the process 900 can determine in a first step 904 a first specific waypoint of at least two waypoints based on, for example, priority of the waypoint, proximity to a user, or other suitable criteria. Ideally, a user will be notified when their path or "crumb trail" brings them within "X" meters of a predetermined type of establishment, such as 100 meters, 50 meters, 25 meters, 10 meters, or even 5 meters. Distance ranging and even compass directional guidance (e.g., in terms of compass degrees or for outbound or inbound directions or display of a compass on the user interface) can be implemented for more sophisticated route guidance.

At step 906, the process generates an indication for presentation to the user with instructions for navigating to a location associated with the first waypoint, such as a physical location of a landmark that requires no feedback. In the next step 908, the process 900 generates an indication to the user instructing the user to go to a landmarked location, such as public place or a landmark, and may optionally include specific instructions regarding the waypoint.

The process 900 queries the mapping system at step 910 to determine whether the first specific route has been completed, and it can iteratively check for route integrity and completion at step 912 before moving on to additional waypoints on the route (this is an active bread-crumbed route). In some cases, verifying that a route is complete can include receiving a user input indicating that the route or waypoint is complete, which can in some cases include a verification such as a code or an image of a completed route or waypoint to be acknowledged by the user.

When the first specific waypoint has been verified as complete or achieved at step 912, the process 900 can generate an indication that the first specific route is complete at step 914. Next, the process can determine a second specific route for completion after the first waypoint has been successfully reached and the user is still on route, based on the direction in step 916. In some cases, determining the second route may include skipping one or more routes and waypoints of the original routing set. For example, if one or more additional users have also completed routes from the original path, the process 900 will use their experience to assist in proper route guidance; thus, the routing becomes a dynamic routing.

Next, the process 900 generates an indication to a user, which may be the same user or may be a different user that has completed the first route, with instructions for navigating to a location associated with the second specific waypoint at step 918. In step 920 the process 900 generates an indication to the user instructing the user to "perform" the second specific waypoint, such as performing the access or maintenance of a component, and may optionally include specific instructions regarding the procedure for performing the waypoint. The process 900 then queries the mapping system to determine whether the second specific waypoint is complete at step 922. As above, the system can iteratively check whether the second specific waypoint has been reached at decision point 924, and it can optionally check for user return progress completion to the second waypoint. In addition, it will identify by receiving a user input indicating that the second route waypoint is complete, which can in, some cases, include a verification such as a code or an image of a completed waypoint being displayed on the user management device 102. When the second route is complete, the system can, as above, generate an indication to the user that the second route is complete at step 924. The system can proceed to repeat steps 914-924 for additional waypoints.

FIG. 10

FIG. 10 illustrates a second example process 1000 for providing user instructions to a user. Aspects of the process 1000 may be performed, in some implementations, by a system similar to the systems 600, 700, and 800 shown in FIGS. 6-8. The systems may be implemented for applications and in environments such as those applications and environments shown in FIGS. 1-5.

The process 1000 includes a first step 1002 for receiving instructions for performing return routing waypoints in a mapping system. Based on the guidance, the process 1000 determines at step 1004 an ordered list of the waypoints, including at least a first specific return point based on, for example, how visible the waypoint is, proximity to a well-known waypoint, or other suitable criteria. The process can allocate routes from the list of waypoints to one or more multiple users depending on, for example, allocation of a return route from a list of possible known waypoints at step 1006. Next, the process 1000 generates instructions that are provided to a user assigned to the first route for navigating to a location associated with the nearest waypoint, such as a physical location of a publicly identified point that requires the system to generate indications with instructions as the user performs the first route from a mapping system. The route starts and the bread-crumb trail will begin to track the movement and map to relative waypoints so the user can return to the point of initiation at step 1008, and optionally the process may send a prompt or indication to the user instructing the user to perform the first specific waypoint, such as performing verification or identifier of the component, and may optionally include specific instructions regarding the orientation.

The process 1000 generates a prompt 1010 to the user for determining or verifying whether the first specific "bread-crumb" has been completed. This can include requiring a verification input 1012 such as a code provided at the site, or a transmitted image showing an image of the site where the user "should be." This is a comparative analysis of the bread-crumbed route or other suitable user input and it can iteratively check for route completion by the user before moving on to additional waypoints. In some cases, where a verification value is incorrect, the process generates an indication that the route or waypoint is incomplete or that an incorrect route has been completed 1014. If the correct verification input verifying that a partial route is complete has been provided, the process can generate an indication that the first specific route has been completed 1016. Next, the process 1000 proceeds to generate an indication with instructions to perform a second specific route 1018 from the ordered list of waypoints to the user, which may include reassigning routes or a continuance of the existing return route. In some cases, the verification code can include a carry-through code, such that the verification code must be acknowledged and bread-crumb re-guidance must be re-verified.

FIG. 11

Figure 11:
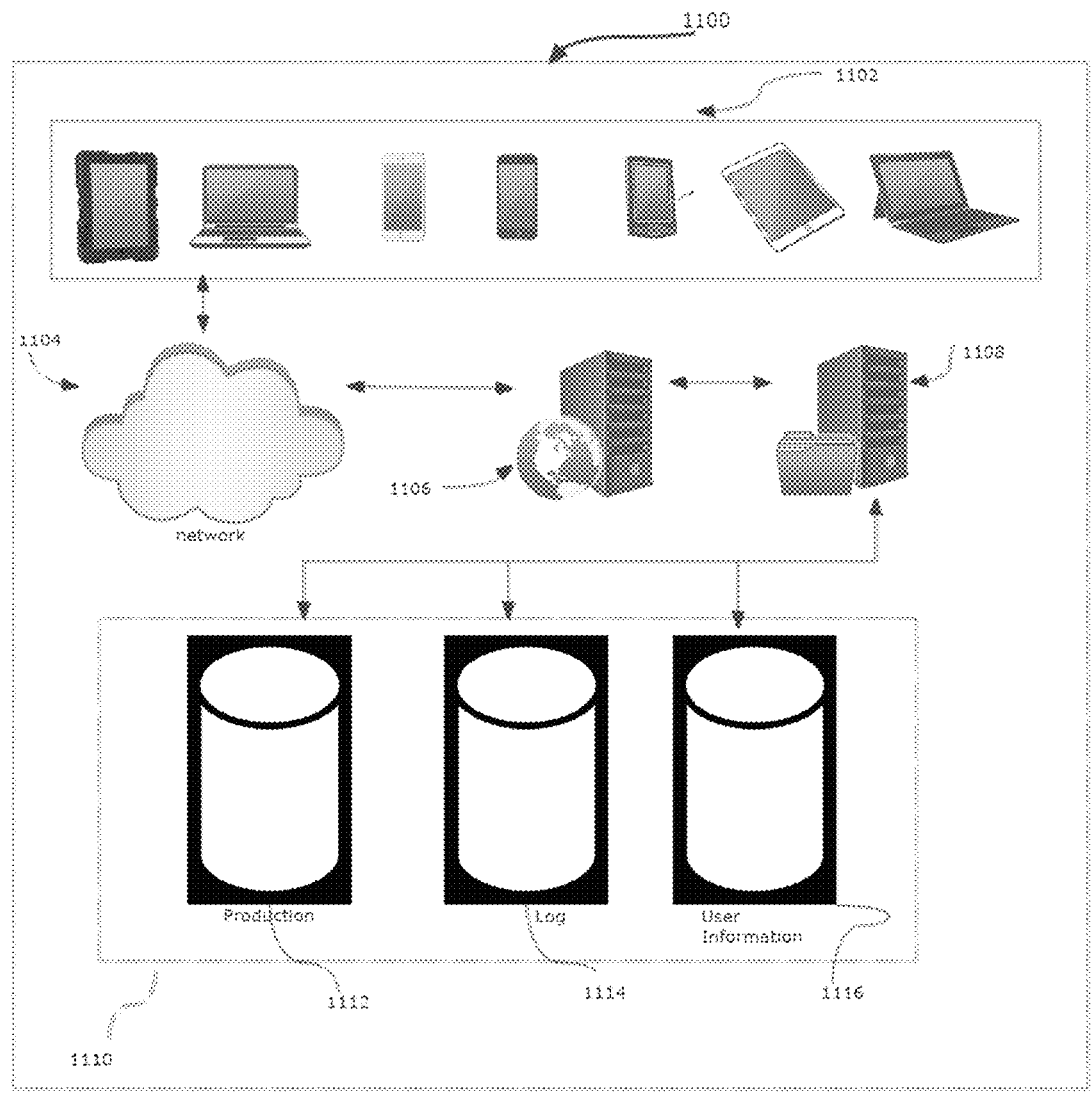
FIG. 11 illustrates representative features of an environment for implementing certain aspects of the present disclosure.

FIG. 11 illustrates further aspects of the present disclosure in an example environment 1100. As will be appreciated, although a Web-based environment is used for purposes of explanation, different environments may be used, as appropriate, to implement various implementations. The environment 1100 includes an electronic client device 1102, which can include any appropriate device operable to send and receive requests, messages 1100, or information over an appropriate network 1104 and convey information back to a user of the device. Examples of such client devices include personal computers, cell phones, handheld messaging devices, laptop computers, personal data assistants, electronic book readers, and the like.

The network 1104 can include any appropriate network, including an intranet, the Internet, a cellular network, a local area network, or any other such network or combination thereof. Components used for such a system can depend at least in part upon the type of network or environment selected. Protocols and components for communicating via such a network are well known and will not be discussed herein in detail. Communication over the network 1104 can be enabled by cellular and wireless connections and combinations thereof as are well known in the art. In this example, the network 1104 includes the Internet, as the environment includes a Web server 1106 for receiving requests and serving content in response thereto, although for other networks an alternative device serving a similar purpose could be used, as would be apparent to one of ordinary skill in the art.

The illustrative environment 1100 includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment.

The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web Server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required, and are merely example components, as structured code discussed herein can be executed on any appropriate device or host machine as discussed elsewhere herein.

The data store 1110 can include several separate data tables, databases or other data storage mechanisms and media for storing data relating to a particular routing guidance with identifiers for the return journey. For example, the data store illustrated includes mechanisms for storing routing data 1112 and user information 1116, which can be used to serve content for the tracking side. The data store also is shown to include a mechanism for storing log data 1114 supplied by public domains, which can be used for reporting, analysis, or route tracking.

It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a specific location destination and the route guidance will incorporate a return route that is tracked and returned to the user via the implementation. In this case, the data store might access the user information to verify the identity of the user and can access the catalog detail information to obtain information about location, guide, public places, etc. The information then can be returned to the user, such as in a results listing on a Web page that the user is able to view via a browser on the user device 1102. Information for a particular item of interest can be viewed in a dedicated page or window of the browser when signaled by a bread-crumb.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions; this server can be hosted on premise or it can be cloud hosted. Suitable implementations for the operating system and general functionality of the servers are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

Implementations:

The various implementations further can be implemented in a wide variety of user environments, which in some cases can include one or more user smart phones, personal tablets or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include any electronic device that is capable of communicating via a network.

Most implementations utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In implementations utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network, public cloud capable, and hybrid compute cloud. In a particular set of implementations, the information may reside in a storage area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be wirelessly coupled via a Wi-Fi, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, machine-readable code, QR codes, etc.), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate implementations may have numerous variations from that described above. For example, customized hardware might also be used, and/or particular elements might be implemented in hardware, software (including portable software, such as applets), or both. Further, connection to other computing devices such as network input/output devices may be employed. The use of QF codes will be important as it will leverage other users' experience in order to identify and track progress and movement—including sponsor businesses.

Storage media computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various implementations.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to track a user's geographical position and plot one or more return routes via waypoints, the system comprising:
   a user device operable to send and receive requests, messages, and information over a communication network, the user device including a user interface capable of conveying requests, messages, and information to the user of the device; and
   at least one application server and a data store that includes hardware and software to integrate with the data store as needed to execute aspects of one or more applications for the user device, handling data access and business logic for the one or more applications, the application server operable to provide access control services in cooperation with the data store to generate content comprising at least one from among text, graphics, audio, and video to be conveyed to the user via the user interface; and
   executable instructions to be stored on the user device and operable to generate digital identifiable waypoints to ensure path tracking and to establish location and to generate a return path to be conveyed to the user via the user interface, the executable instructions providing instructions to a user for a route guidance that includes:
   (a) receiving route guidance instructions to one or more waypoints in a mapping system;
   (b) in response to the instructions, determining a first specific waypoint of the one or more waypoints;
   (c) generating an indication for display to the user one or more instructions to enable navigating by the user on a first route to a location associated with a first waypoint;
   (d) generating an indication for display to the user instructing the user to go to the first waypoint;
   (e) querying a mapping system to determine whether the user is located at the first waypoint;
   (f) in response to determining the user has reached the first waypoint, generating an indication for display to the user that the first waypoint has been reached;
   (g) determining a second route for completion after the first waypoint has been successfully reached and the user is still on route, based on the received directions;
   (h) generating an indication for display to the user instructions for navigating to a second waypoint;
   (i) querying the mapping system to determine whether the second waypoint has been reached;
   (j) repeating (h) and (j) for additional waypoints.

2. The system of claim 1 wherein weigh points include links to third-party websites associated with respective waypoints.

3. A method of providing instructions to a user for route guidance, the method comprising:
   (a) receiving route guidance instructions to one or more waypoints in a mapping system;
   (b) in response to the instructions, determining a first specific waypoint of the one or more waypoints;
   (c) generating an indication for display to the user one or more instructions to enable navigating by the user on a first route to a location associated with a first waypoint;
   (d) generating an indication for display to the user instructing the user to go to the first waypoint;
   (e) querying a mapping system to determine whether the user is located at the first waypoint;
   (f) in response to determining the user has reached the first waypoint, generating an indication for display to the user that the first waypoint has been reached;
   (g) determining a second route for completion after the first waypoint has been successfully reached and the user is still on route, based on the received directions;
   (h) generating an indication for display to the user instructions for navigating to a second waypoint;
   (i) querying the mapping system to determine whether the second waypoint has been reached;
   (j) repeating (h) and (j) for additional waypoints.

4. The method of claim 3, further comprising generating an indication for display to the user instructing the user to perform a task at the first or subsequent waypoint.

5. The method of claim 3, wherein the waypoint comprises at least one from among a public place, a landmark, and an address.

6. The method of claim 3 wherein querying the mapping system comprises checking for route integrity and verifying that a route is complete before moving on to additional waypoints on the route.

7. The method of claim 6, wherein verifying that a route is complete comprises receiving a user input indicating that a waypoint has been reached or that a route is complete.

8. The method of claim 6 wherein verifying the route is complete comprises the user providing an indication in the form of a code or photographic image.

9. The method of claim 3 wherein determining a second route comprises skipping one or more routes and waypoints received in the instructions in response to user input.

10. The method of claim 3, wherein querying the mapping system to determine if the second waypoint has been reached includes checking for user return progress to the second waypoint from a third waypoint.

11. A method of providing real time route guidance to a user, comprising:
   (a) receiving instructions for performing return routing waypoints in a mapping system;
   (b) in response to the instructions, determining an ordered list of waypoints, including at least a first specific return point based on one or more of how visible the waypoint is and proximity to a well-known waypoint;
   (c) allocating routes from the list of waypoints to one or more multiple users depending on allocation of a return route from the list of waypoints;
   (d) generating instructions to a user assigned to the first route for navigating to a location associated with a nearest waypoint from the list of waypoints;
   (e) tracking user movement from a point of initiation to waypoints on the list of waypoints;
   (f) generating a prompt to the user to determine whether the first waypoint has been reached;
   (g) verifying by comparative analysis of the route traveled by the user whether the user has completed a route to the first waypoint and in response to determining the route is incomplete or the waypoint has not been reached, generating an indication for display to the user that the route is incomplete or that the waypoint has not been reached, and in response to verifying the route is complete or the waypoint has been reached, generating an indication for display to the user that the route is complete or that the way point has been reached;
(h) repeating (d)-(g) for all waypoints on the list of waypoints.

12. A stand-alone system to track a user's geographical position and plot one or more return routes via waypoints, the system comprising:
   (a) a portable user device having an internal communication network operable to send and receive internal requests, messages, and information on the user device, the user device including a user interface capable of conveying requests, messages, and information to the user of the device; and
   (b) at least one application server and a data store that both reside on the user device and include hardware and software to execute aspects of one or more applications on the user device, to handle data access and business logic for the one or more applications, the at least one application server operable to provide access control services in cooperation with the data store to generate content comprising at least one from among text, graphics, audio, and video to be conveyed to the user via the user interface, and to provide selected communications internal to the user device via the communications network for stand-alone path tracking and waypoint identification; and
   (c) executable instructions to be stored on the user device and operable to generate identifiable waypoints to be used in user path tracking, to establish user location, and to generate a return path to a point of initiation to be conveyed to the user via the user interface, the executable instructions enable providing real time route guidance to the user, including:
      (i) receiving instructions for performing return routing waypoints in a mapping system;
      (ii) in response to the instructions, determining an ordered list of return routing waypoints, including at least a first specific return routing waypoint based on one or more of how visible the return routing waypoint is and proximity to a well-known waypoint;
      (iii) allocating routes from the list of return routing waypoints to one or more multiple users depending on allocation of a return route from the list of return routing waypoints;
      (iv) generating instructions to a user assigned to the first route for navigating to a location associated with a nearest return routing waypoint from the list of return routing waypoints;
      (v) tracking user movement from a point of initiation to return routing waypoints on the list of waypoints;
      (vi) generating a prompt to the user to determine whether the first return routing waypoint has been reached;
      (vii) verifying by comparative analysis of the route traveled by the user whether the user has completed a route to the first return routing waypoint and in response to determining the route is incomplete or the return routing waypoint has not been reached, generating an indication for display to the user that the route is incomplete or that the return routing waypoint has not been reached, and in response to verifying the route is complete or the return routing waypoint has been reached, generating an indication for display to the user that the route is complete or that the return routing waypoint has been reached;
      (viii) repeating (d)-(g) for all return routing waypoints on the list of return routing waypoints.

13. The system of claim 12 wherein the communication network includes a radio communication circuit capable of global positioning system communications.

* * * * *